Figure 1:
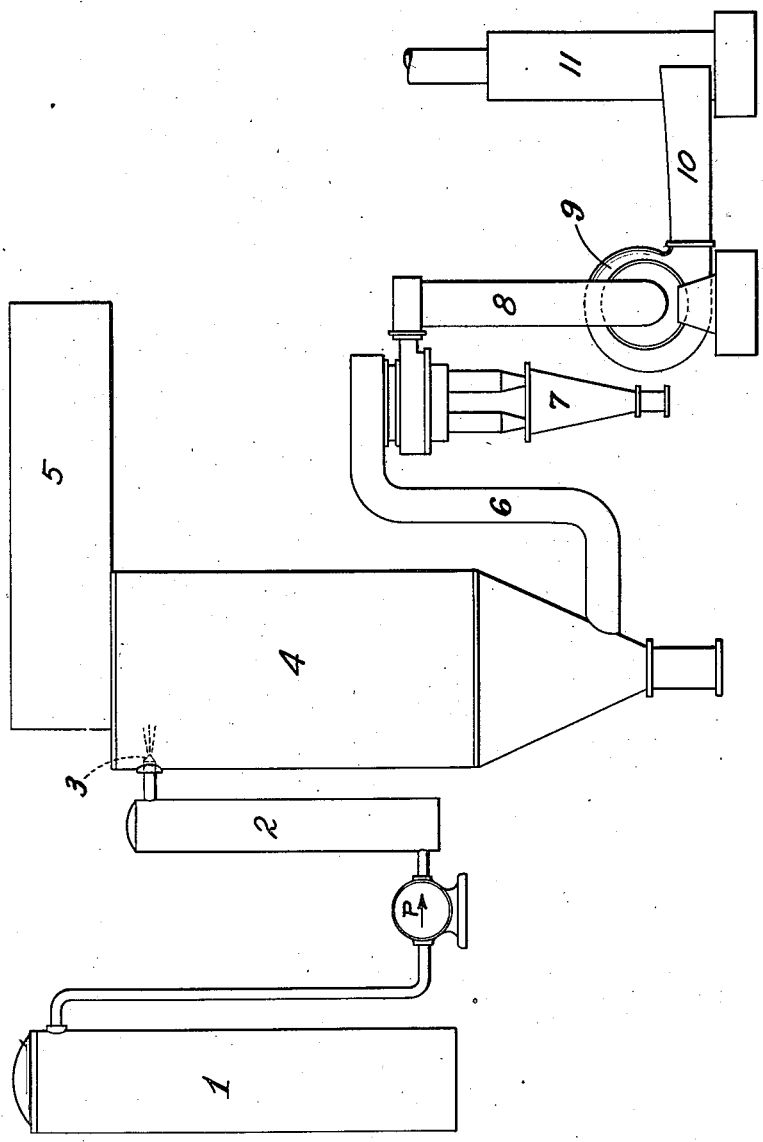

March 18, 1947. L. F. MAREK 2,417,772
PROCESS FOR PREPARING SUBSTANTIALLY ANHYDROUS MAGNESIUM CHLORIDE
Filed Feb. 14, 1944

INVENTOR.
LEROY F. MAREK
BY
Richey Watt
ATTORNEYS

Patented Mar. 18, 1947

2,417,772

UNITED STATES PATENT OFFICE 2,417,772

PROCESS FOR PREPARING SUBSTANTIALLY ANHYDROUS MAGNESIUM CHLORIDE

Leroy F. Marek, Lexington, Mass., assignor to Arthur D. Little, Inc., a corporation of Massachusetts Application February 14, 1944, Serial No. 522,216

11 Claims. (Cl. 23—91)

This invention relates to improvements in the process of dehydrating magnesium chloride.

In the past, much work has been done to obtain an anhydrous magnesium chloride product suitable for the production of metallic magnesium by electrolysis on a commercial scale, and for other purposes. Magnesium chloride may be easily obtained in the form of $MgCl_2.6H_2O$ or $MgCl_2.4H_2O$ by crystallization from water solutions. Although it is well known that by maintaining moderate drying conditions of not over 220° F., $MgCl_2.6H_2O$ may be dehydrated to $MgCl_2.2H_2O$ quite satisfactorily, the difficulty that has been encountered is to obtain magnesium chloride with substantially all of the water of crystallization removed, without undesirable decomposition and the formation of oxides and hydroxychlorides of magnesium.

In order to dehydrate the dihydrate further, it is necessary that higher temperatures be employed since the partial pressure of water vapor over the dihydrate at 220° F., is too small for any practical drying rate. However, as the temperature of the dihydrate is raised to values higher than about 220° F., a decomposition resembling hydrolysis occurs and the heated salt gives off both water vapor and HCl gas. The extent to which HCl gas is given off determines the degree to which decomposition to oxide or hydroxychloride occurs, and hence, the degree to which the original magnesium chloride is degraded to a product which has less value for the purposes referred to herein. Furthermore, as dehydration proceeds beyond the dihydrate stage, the decomposition partial pressure of HCl gas increases in such a manner as to exceed that of the dehydration partial pressure of water vapor and the temperature necessary to maintain a given water vapor partial pressure must be progressively increased.

In order to circumvent this undesired decomposition during dehydration many attempts have been made, some in commercial installations, to use dehydrating atmospheres containing sufficient HCl gas to prevent evolution of HCl from the salt being dehydrated. Although considerable effort has been devoted to this method, so far as we know, it has not been found satisfactory commercially and has been abandoned except for production of laboratory quantities of pure anhydrous magnesium chloride.

Methods based on the heating of magnesium chloride hydrates in atmospheres not containing added HCl, usually give a product containing more or less of the decomposition products depending on conditions of temperature, exposure of material to the evolved water vapor, etc.

Because of these factors, it has become the practice in at least one commercial process to feed the electrolytic cell or a decomposition forecell with magnesium chloride only moderately dehydrated beyond the dihydrate stage, despite the several objectionable characteristics of such practice.

As electrolytic cell feed, use of magnesium chloride containing any substantial amount of water has several disadvantages, among which are: (1) oxidation and dispersion of the magnesium formed, thus reducing the amount recovered; (2) the production of MgO which is undesirable; (3) excessive consumption of electric energy; (4) excessive consumption of the carbon electrodes; and (5) the dilution of $Cl_2$ with HCl and water vapor.

Magnesium chloride containing substantially no water would avoid all these disadvantages. It is, therefore, clear that if a process could be devised which would economically produce substantially anhydrous magnesium chloride, such a process would be quite important; and its value would be increased considerably if it could produce such a product directly from magnesium chloride containing more water than is equivalent to composition of the tetrahydrate $(MgCl_2.4H_2O)$ The present invention also has as an aim to provide particles of magnesium chloride which have new and improved physical properties and characteristics and contain substantially no water, and to provide a commercial process for directly converting hydrated magnesium chloride containing at least about 25% and as much as about 70% water into a substantially anhydrous form.

Briefly stated, the process of this invention includes the steps of passing aqueous magnesium chloride solution through a suitable heating device wherein it is superheated at least 50° F. while under pressure sufficient to maintain it in liquid phase; partially flash-drying the solution by atomizing it into a closed chamber containing hot gases; further dehydrating the resulting fine particles by contact with said hot gases, and collecting the resulting dehydrated particles.

So far as I know, no one has ever proposed to superheat hydrated magnesium chloride under pressure and then to spray it into hot gases and by these means obtain a new product; that is, one consisting of minute particles of broken, hollow spheres, and containing less than about 10% of water calculated on the basis of the hydrogen content of the compounds formed.

The figure is a diagrammatic flow sheet of a process involving the present invention.

As a specific example of the practice of this invention, according to the depicted process, an approximately 47% solution of magnesium chloride is prepared in any suitable manner; for example, by melting crystals of magnesium chloride hexahydrate. The resulting solution is charged into preheat tank 1 where the temperature of the solution is raised from the melting temperature of about 243° F. to about 290° F. before it is pumped to the tubular superheater 2 and subjected to a pressure of about 500 lbs. per square inch.

In the superheater the temperature may suitably be carried to about 500° F. which is far above the point at which the solution boils at atmospheric pressure; but no boiling takes place because the liquid is maintained under hydraulic pressure in excess of its vapor pressure. The extent of superheating in actual practice is dictated by economic and other considerations and I have found it desirable to carry the temperature of the solution to about 150° F. above its normal boiling point; that is, to between about 470° F. and about 480° F. for an approximately 47% solution of magnesium chloride. Inasmuch as the quality of the product is improved with each increase in the temperature of superheat without boiling, this invention is not limited to the highest pressures and temperatures mentioned here and in the examples.

The solution on leaving the superheater is forced through atomizing nozzle 3 into spray tower 4, where, for convenience, substantially atmospheric pressure is maintained and where the solution comes into contact with hot gases passing through said tower. Flue gases having a temperature in the range of 1000° F. to 1500° F. or higher are introduced into the spray tower through refractory duct 5, and within the tower these gases contact the atomized solution flowing concurrently therewith and lose thereto some of their heat, thus effecting rapid dehydration and solidification of the atomized material.

Other hot gases may be used instead of flue gases, for example, gases such as carbon dioxide or nitrogen or mixtures thereof. Preheated air may also be used, but we prefer to avoid it because of its oxidizing action upon MgCl₂. Since the purpose in using such gases is to apply additional heat to the atomized solution, the temperature of said gases at the point where they come into contact with said solution should be at least equal to that of the solution and, preferably, should be considerably higher.

When the hydraulic pressure maintained on the solution of magnesium chloride during superheating is suddenly released by atomizing the solution into hot gases maintained at substantially lower pressure, the atomized solution of magnesium chloride is at such levels of temperature that under normal methods of heating to these levels substantial decomposition would occur.

However, because of flash drying, due to the superheat of the liquid and because of the rapid addition of heat from the hot gases to which they are exposed, the particles are dried extremely rapidly. I have found that this extremely rapid drying, in accordance with the process of the invention, results in a greater degree of dehydration of magnesium chloride with less decomposition than is possible with commercial processes known to me.

All except the largest of the solid dehydrated particles of magnesium chloride, which may settle to the bottom of the tower, are carried by gases vented through duct 6 to the multiclone collector 7, where an effective separation of gases from solids is made. As the gases are withdrawn from the collector through duct 8, the dried solid product settles to the bottom of said collector, where it may be drawn off from time to time.

Instead of the multiclone collector, electrostatic precipitators, bag filters, centrifugal dust collectors or combinations of these and other means may be employed to collect the product borne by the gases issuing from the spray tower.

Gases vented from the multiclone through duct 8 are drawn into fan 9, which provides draft for the system from the extremities of the refractory duct and which exhausts the gases from the system through duct 10 and water scrubber 11. Gaseous products such as hydrogen chloride and finely divided particles of magnesium chloride not caught by the collectors are conveniently recovered as the gases pass through the water sprays of the scrubber. Since the impurities are absorbed in the water and since the impurities, particularly magnesium chloride, are of value, it may be found feasable to concentrate the aqueous material issuing from the scrubber and to recycle in this process the resulting solution of magnesium chloride.

As with most processes, it is preferable to operate this process continuously, which is easily accomplished by providing a constant supply to the preheat tank of a solution of magnesium chloride and water containing between about 25% and about 70% of magnesium chloride and by maintaining a constant flow through the spray tower of hot gases having a temperature of preferably between about 1000° F. and about 1500° F. Continuous operation necessitates, also, regular withdrawal of solids deposited in the spray tower and in the multiclone collector.

In the operation of the processing of this invention as hereinbefore described, if the tetrahydrate of magnesium chloride is employed instead of the hexahydrate, it will not be possible to melt the material without applying pressure thereto or admixing calcium chloride or some other suitable melting point depressant therewith. The addition of calcium chloride may also advantageously be used in melting the dihydrate, but whether calcium chloride is added or not, pressure is necessary in this case.

The composition of a typical product produced in the manner described was found upon analysis to be 80% magnesium chloride; 11% magnesium hydroxychloride and 9% magnesia, with no water of crystallization. In addition to the absence of water and the high ratio of magnesium chloride to the hydroxychloride and oxide, this product possesses the desirable quality of saving a somewhat greater bulk density than magnesium chloride spray dried in the conventional manner, that is, without superheat. The fact that the hollow spheres formed during the spray operation are ruptured, when superheated magnesium chloride is used, accounts for the characteristic appearance of the product of the invention as fragments of broken hollow spheres. If the product is to be used in an electrolytic cell for reducing magnesium chloride to magnesium and chlorine, increased bulk density is desirable whether the product is introduced into the cell as fines, briquettes, roller compressed flakes, etc.

Depending upon the superheat and the pressure upon the solution when it is atomized as described, the long dimension of particles of magnesium chloride thus produced may vary from less than about 1 micron to about 100 microns or more. The larger particles, that is, those having a long dimension greater than about 100 microns, are not sought after since they are not readily removed from the spray tower by the escaping gases, nor are they readily dehydrated.

While the broken hollow sphere particles of magnesium chloride usually are smaller than hollow spheres produced by spray drying without superheat, the particles are somewhat less buoyant than said spheres and the dusting losses in cell charging are correspondingly decreased through the use of such particles. In briquetting, also, the difference between the two products becomes apparent since the broken spheres briquette more readily and form a more compact product.

The mechanism by which the minute solid particles are obtained is believed to be as follows: When a superheated solution of magnesium chloride is sprayed through a nozzle under such conditions as to produce fine particles tiny hollow spheres of superheated magnesium chloride solution are formed. Due to the superheat, and the heat from the gases, water rapidly evaporates from the surfaces of the spheres, both inside and out. The pressure inside the spheres rapidly builds up due to this evaporation to a point where it exceeds the external pressure on the spheres. This pressure differential presumably ruptures the spheres resulting in particles showing the characteristic appearance of segments of a spherical surface.

Because of the continued evaporation of water from the particles after spraying of the solution, and during the events outlined above, the final spherical segments become more or less dehydrated solidified particles. These fine particles are further dried by the gases which, by means of suction or pressure, are passed through the chamber along with the hot gases.

From the above description it is apparent that the process produces dehydration which is so rapid that little decomposition takes place. To illustrate the effect which the rate of dehydration has on decomposition, Tables I and II are given below. Four processes are tabulated: kiln-drying, partial pressure technique, dehydration by feeding $MgCl_2 \cdot 2H_2O$ to molten magnesium chloride, and the procedure of the present invention. In the kiln-drying process hydrated magnesium chloride is placed in a kiln or drier which is then heated externally as rapidly as possible until the charge is at a temperature of 750° F., while a slow stream of nitrogen is passed through the kiln; the total time of heating is suitably about one hour, but the time of exposure at 750° F. is 15 minutes. In the partial pressure evaporation technique, a hydrated salt, such as the dihydrate, is fed into a bath of boiling liquid such as high-boiling naphtha, or any similar material which is not attacked by either water or magnesium chloride. The inert atmosphere thus formed readily takes up water vapor and removes it from the salt being dehydrated in the liquid.

The third method may be accomplished by slowly feeding a hydrate of magnesium chloride directly to a melt containing, for example, 42% magnesium chloride and 58% sodium chloride. Rapid dehydration takes place on the surface of the melt before the added material sinks beneath the surface or dissolves in the melt. The fourth process is the present invention which involves ½ to 2 minutes exposure to gases.

TABLE I

|  | Composition of dried product | | |
|---|---|---|---|
|  | Per cent MgO | Per cent $MgCl_2$ | Per cent $Mg(OH)Cl$ |
| Kiln-drying (750° F.) | 1 | 19 | 80 |
| Partial pressure technique | 3 | 55 | 42 |
| Dihydrate to molten salt bath | 13 | 87 |  |
| Process of present invention | 9 | 80 | 11 |

TABLE II

| | Distribution of magnesium in original hydrate containing 100 mols of magnesium after introduction into the cell | | | |
|---|---|---|---|---|
| | (a) Mol per cent $MgCl_2$ | (b) Mol per cent $MgCl_2$ from $MgOHCl$ (42.5 mol per cent of $MgOHCl$) | (c) Total available $MgCl_2$ $(a+b)$ | (d) Mol per cent Mg unavailable as MgO, or $MgCl_2$ in sludge |
| Kiln-drying (750° F.) | 15.8 | 35.0 | 50.8 | 49.2 |
| Partial pressure technique | 48.3 | 19.3 | 67.6 | 32.4 |
| Dihydrate to molten salt bath | 74.0 |  | 74.0 | 26.0 |
| Process of present invention | 69.7 | 5.0 | 74.7 | 25.3 |

It was assumed in composing Table II, and in my experience it has generally proven to be the fact, that upon introducing magnesium hydroxychloride ($MgOHCl$) into a molten magnesium cell-type bath, decomposition of said hydroxy compound occurs and approximately 42½ mol percent of its magnesium becomes available magnesium chloride.

The four processes are arranged in the descending order of time consumed in the drying process. It is apparent that the faster the time of drying, the better the final product as cell feed.

The following examples, which are to be considered illustrative, rather than limiting, will serve to describe the invention more fully:

*Example I*

$MgCl_2 \cdot 6H_2O$ crystals were heated to 284° F. to form a solution which was then pumped into a tubular heater and heated to 471° F. under a pressure 500 pounds per square inch. It was then sprayed into flue gases heated to 1400° F. The temperature of the exhaust gases was 672° F. The product had the following composition:

| | Per cent |
|---|---|
| $MgCl_2$ | 80.2 |
| $Mg(OH)Cl$ | 11.0 |
| MgO | 8.8 |
| Free $H_2O$ | 0.0 |
| Total $H_2O$ (calculated on basis of $Mg(OH)Cl$) | 1.3 |

*Example II*

$MgCl_2 \cdot 6H_2O$ crystals were heated to 284° F. to form a solution which was then pumped into a tubular heater and heated to 500° F. under a pressure of 400 pounds per square inch. It was then sprayed into flue gases heated to 1472° F.

The temperature of the exhaust gases was 632° F. The product had the following composition:

| | Per cent |
|---|---|
| $MgCl_2$ | 80.5 |
| $Mg(OH)Cl$ | 11.9 |
| $MgO$ | 5.0 |
| Free $H_2O$ | 2.6 |
| Total $H_2O$ (free and calculated on basis of $Mg(OH)Cl$) | 4.0 |

Having thus described the present invention so that others skilled in the art may understand and practice the same, I state that what I desire to secure by Letters Patent is defined in what is claimed.

What is claimed is:

1. The process of making substantially anhydrous magnesium chloride which comprises the steps of heating a solution comprising magnesium chloride and water to a temperature about 50° F. above its boiling point temperature under hydraulic pressure sufficient to maintain it in the liquid phase, and then atomizing said solution in a zone of lesser pressure in the presence of gases having a temperature at least equal to that of the superheated solution.

2. The process of making substantially anhydrous magnesium chloride which comprises the steps of superheating a solution comprising magnesium chloride and at least enough water to correspond to the formula $MgCl_2.2H_2O$ under hydraulic pressure sufficient to maintain it in the liquid phase while at least 50° F. of superheat is imparted to said solution, and then atomizing the superheated solution in a zone of lesser pressure in the presence of gases having a temperature at least equal to that of said superheated solution.

3. The process of making substantially anhydrous magnesium chloride which comprises the steps of superheating a solution comprising magnesium chloride and at least enough water to correspond to the formula $MgCl_2.4H_2O$ under hydraulic pressure sufficient to maintain it in the liquid phase while the temperature of said solution is raised to at least about 300° F. and then atomizing the superheated solution in a zone of lesser pressure in the presence of gases having a temperature at least equal to that of said superheated solution.

4. The process of making substantially anhydrous magnesium chloride which comprises the steps of superheating a solution of magnesium chloride containing about 53% of water under hydraulic pressure sufficient to maintain it in the liquid phase while the temperature of said solution is raised to between about 300° F. and about 500° F., and then atomizing the superheated solution in a zone of lesser pressure in the presence of gases having a temperature of at least 1000° F.

5. The process of making substantially anhydrous magnesium chloride which comprises the steps of heating hydrated magnesium chloride to a temperature at least 50° F. above the boiling point while maintaining it in the liquid phase by applying hydraulic pressure, removing the water therefrom by bringing the superheated solution in finely divided form into gases in a zone of lesser pressure having a temperature approximating that of said solution, and separating and removing the solids from the gases.

6. The process of claim 1 wherein said solution of magnesium chloride is $MgCl_2.4H_2O$ in molten form.

7. The process of claim 1 wherein said solution of magnesium chloride is $MgCl_2.6H_2O$ in molten form.

8. The process of claim 1 wherein said gases consist principally of flue gas.

9. The process of claim 1 wherein said gases are non-oxidizing gases.

10. The process for preparing substantially anhydrous magnesium chloride from hydrous magnesium chloride which comprises the step of atomizing said hydrous substance as a liquid at a temperature at least 50° F. above its boiling point temperature in a zone of lesser pressure in the presence of gases having a temperature at least as high as that of the liquid as it is atomized.

11. The process for preparing substantially anhydrous magnesium chloride from hydrous magnesium chloride which comprises the steps of atomizing said hydrous substance as a liquid at a temperature at least 50° F. above its boiling point temperature in a zone of lesser pressure and in the presence of gases having a temperature at least as high as that of the liquid being atomized, separating said gases from the resulting dry, solid magnesium chloride particles and separating and recovering said particles from any moist magnesium chloride particles.

LEROY F. MAREK.

REFERENCES CITED

The following references are of record in the file of this patent:

UNITED STATES PATENTS

| Number | Name | Date |
|---|---|---|
| 1,497,201 | Wheat | June 10, 1924 |
| 2,215,133 | Lawrence et al. | Sept. 17, 1940 |
| 2,201,206 | Schmid et al. | May 21, 1940 |
| 1,359,652 | Ashcroft | Nov. 23, 1920 |
| 1,479,982 | Collings et al. | Jan. 8, 1924 |